US008352912B2

(12) United States Patent
Bhatkhande et al.

(10) Patent No.: US 8,352,912 B2
(45) Date of Patent: Jan. 8, 2013

(54) METHOD AND SYSTEM FOR TOPOLOGY MODELING

(75) Inventors: Mandar Ganesh Bhatkhande, Milpitas, CA (US); Srikanth Bhattiprolu, Santa Clara, CA (US); Atul Ravindra Daherkar, Cedar Park, TX (US); Thomas Pollinger, San Mateo, CA (US); Charles James Redlin, Rochester, MN (US); Chidanandan Theyancheri, Pleasanton, CA (US); Kai Mike Zhang, Lake Oswego, OR (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/335,475

(22) Filed: Dec. 15, 2008

(65) Prior Publication Data
US 2010/0153916 A1 Jun. 17, 2010

(51) Int. Cl.
*G06F 9/44* (2006.01)
(52) U.S. Cl. ......................... 717/120; 717/104
(58) Field of Classification Search .................. 717/120
See application file for complete search history.

(56) References Cited

U.S. PATENT DOCUMENTS

| | | | | |
|---|---|---|---|---|
| 7,120,896 | B2* | 10/2006 | Budhiraja et al. | 717/105 |
| 7,657,887 | B2* | 2/2010 | Kothandaraman et al. | 717/176 |
| 8,069,437 | B2* | 11/2011 | Aigner et al. | 717/109 |
| 2005/0021383 | A1* | 1/2005 | Fliess et al. | 705/8 |
| 2005/0055667 | A1* | 3/2005 | Beringer et al. | 717/108 |
| 2005/0144226 | A1* | 6/2005 | Purewal | 709/203 |
| 2005/0204356 | A1* | 9/2005 | Sundararajan et al. | 717/176 |
| 2006/0031225 | A1* | 2/2006 | Palmeri et al. | 707/10 |
| 2006/0036993 | A1* | 2/2006 | Buehler et al. | 717/104 |
| 2007/0250481 | A1* | 10/2007 | Fiedler | 707/3 |
| 2008/0025230 | A1* | 1/2008 | Patel et al. | 370/252 |
| 2008/0052274 | A1* | 2/2008 | Moore et al. | 707/3 |
| 2008/0065466 | A1* | 3/2008 | Liu et al. | 705/10 |
| 2008/0069124 | A1* | 3/2008 | Patrick | 370/401 |
| 2008/0077652 | A1* | 3/2008 | Grant et al. | 709/203 |
| 2008/0109276 | A1* | 5/2008 | Ionfrida et al. | 705/7 |
| 2008/0163166 | A1* | 7/2008 | Raman | 717/107 |
| 2009/0037871 | A1* | 2/2009 | Blum et al. | 717/101 |
| 2009/0158263 | A1* | 6/2009 | Christophe | 717/154 |
| 2009/0193433 | A1* | 7/2009 | Maes | 719/315 |
| 2009/0228898 | A1* | 9/2009 | Aveyard et al. | 719/314 |
| 2009/0249374 | A1* | 10/2009 | Hepper et al. | 719/332 |
| 2010/0036704 | A1* | 2/2010 | Romano, Jr. | 705/8 |

OTHER PUBLICATIONS

Jia, et al., *A New Architecture Description Language for Service-Oriented Architecture*, IEEE Computer Society, The Sixth International Conference on Grid and Cooperative Computing, 2007 (GCC 2007), Aug. 16-18, 2007 pp. 96-103.

* cited by examiner

*Primary Examiner* — Don Wong
*Assistant Examiner* — Theodore Hebert
(74) *Attorney, Agent, or Firm* — Janaki K. Davda; Konrad, Raynes, Davda & Victor LLP (57) ABSTRACT

A computer program product is provided. The computer program product includes a computer useable medium having a computer readable program. The computer readable program when executed on a computer causes the computer to generate a topology role in a topology role tier that is included in a topology pattern. Further, the computer readable program when executed on a computer causes the computer to create a component in a component tier that is defined in the topology pattern such that the component corresponds to the topology role. In addition, the computer readable program when executed on a computer causes the computer to map the topology role to a deployment target.

20 Claims, 6 Drawing Sheets

METHOD AND SYSTEM FOR TOPOLOGY MODELING

BACKGROUND

1. Field

This disclosure generally relates to software. More particularly, the disclosure relates to topology modeling.

2. General Background

Service Oriented Architecture ("SOA") topology design used to be ad hoc. In other words, a topology used to be designed to address specific problems as they arose. Current approaches have attempted to abstract and adopt patterns for common SOA topologies.

The current deployment and management model is still largely based on the traditional pre-SOA paradigm at the application level. At this low level, users would have to work on individual topology elements, e.g., individual applications and deployment targets, and put them together piece by piece from bottom up. Users can become easily disoriented by this bottom-up application driven approach. In other words, users may develop topology designs with an emphasis on the details and lose focus of the main concepts.

SUMMARY

In one aspect of the disclosure, a computer program product is provided. The computer program product includes a computer useable medium having a computer readable program. The computer readable program when executed on a computer causes the computer to generate a topology role in a topology role tier that is included in a topology pattern. Further, the computer readable program when executed on a computer causes the computer to create a component in a component tier that is defined in the topology pattern such that the component corresponds to the topology role. In addition, the computer readable program when executed on a computer causes the computer to map the topology role to a deployment target.

In another aspect of the disclosure, a process is provided. The process generates a topology role in a topology role tier that is included in a topology pattern. Further, the process creates a component in a component tier that is defined in the topology pattern such that the component corresponds to the topology role. Finally, the process maps the topology role to a deployment target.

In yet another aspect of the disclosure, a system is provided. The system includes a topology role generation module that generates a topology role tier that is included in a topology pattern. Further, the system includes a component generation module that creates a component in a component tier that is defined in the topology pattern such that the component corresponds to the topology role. Finally, the system includes a mapping generation module that maps the topology role to a deployment target.

DRAWINGS

The above-mentioned features of the present disclosure will become more apparent with reference to the following description taken in conjunction with the accompanying drawings wherein like reference numerals denote like elements and in which.

DETAILED DESCRIPTION

A method and system provides a top-down topology drive approach that renders a topological view of the SOA solution. Further, an SOA topology model and language are provided for this approach. In one embodiment, a multi-tier coarse-grained topology pattern model and modeling language is utilized. The multi-tier coarse-grained topology pattern model and modeling language may be utilized for SOA. In one configuration, the number of tiers is three.

Figure 1:
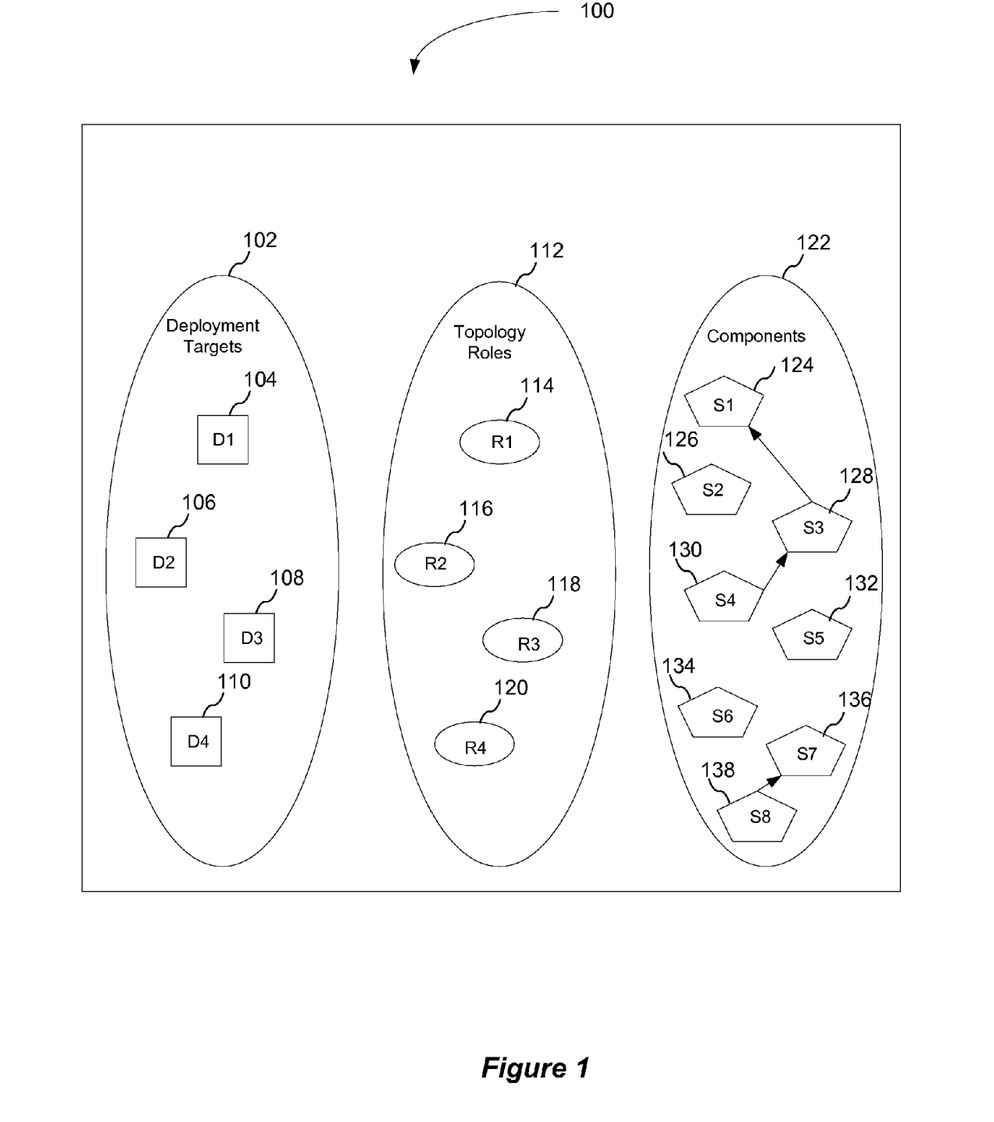
FIG. 1 illustrates an SOA topology model that abstracts SOA topology elements into a plurality of tiers.

FIG. 1 illustrates an SOA topology model 100 that abstracts SOA topology elements into a plurality of tiers. The SOA topology model 100 is a high level course-grained topology which aggregates components into topology roles, i.e., provisioning units which are mapped to deployment targets in a distributed system. Accordingly, the SOA topology model 100 defines the layout of the topology roles. The SOA topology model 100 allows for the abstraction and expression of SOA topology patterns.

In one embodiment, three tiers are utilized. A deployment targets tier 102, i.e., runtime units, a topology roles tier 112, i.e., provisioning units, and a components tier 122, i.e., loosely coupled and self-contained functional units, abstract SOA topology elements. The SOA topology elements are elements in the SOA topology such as individual applications and deployment targets. The term component is herein intended to include the physical component, the service provided by the physical component, or both. In one embodiment, all elements in the SOA topology model 100 can evolve independently as they are loosely coupled and self contained. This SOA topology model 100 fits well with most SOA scenarios.

To express the SOA topology model 100, a generic, flexible and extensible SOA topology definition language is created to model the elements in topology patterns. This XML based modeling language can be used for tooling supports across the topology life cycle, from a topology pattern editor to a topology process instantiation engine. In one embodiment, this approach is also coarse-grained and non-intrusive, as it treats all components as self contained and loosely coupled entities.

Each of the deployment targets of deployment targets tier 102 is a runtime unit, e.g., a single server or a cluster of servers serving as a unit, that hosts one or more topology components. For example, the deployment targets tier 102 may include a deployment target D1 104, a deployment target D2 106, a deployment target D3 108, and a deployment target D4 110.

Further, each of the topology roles 112 is a provisioning unit that includes components to be deployed together. A role is mapped to one or more deployment targets. For example, the topology roles may include a role R1 114, a role R2 116, a role R3 118, and a role R4 120.

In addition, each of the components 122 is a loosely-coupled and self-contained functional unit. The term loosely-coupled is intended to mean that a component may be deployed and configured independently. Further, the term self-contained is intended to mean that a component knows how to instantiate and configure itself. For example, the components 122 may include a component S1 124, a component S2 126, a component S3 128, a component S4 130, a component S5 132, a component S6 134, a component S7 136, and a component S8 138. Although the component S3 128 has a dependency on the component S1 124, the component S4 130 has a dependency on the component S3 128, the component S8 138 has a dependency on the component S7 136, these components may be deployed and configured independently.

Figure 2A:
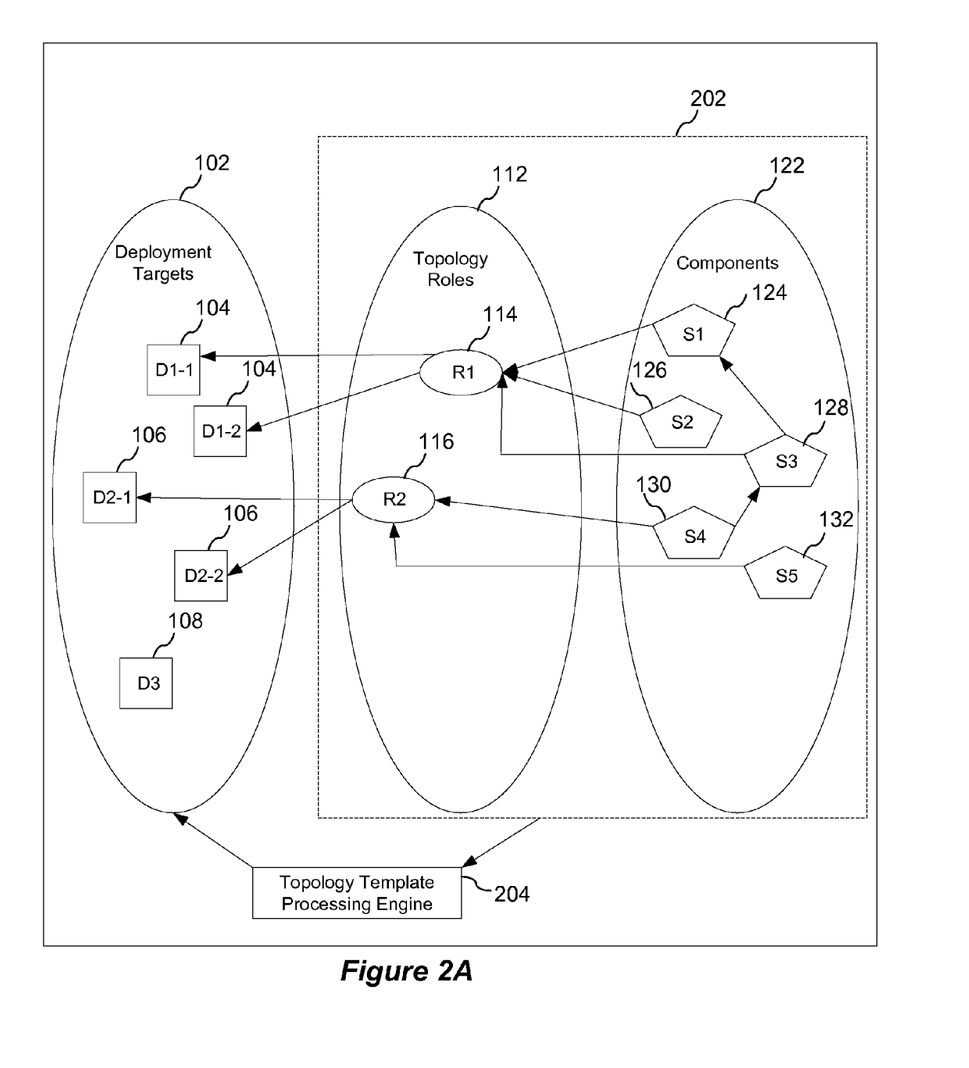
FIG. 2A illustrates an authoring configuration that defines a topology pattern.

FIG. 2A illustrates an authoring configuration 200 that defines a topology pattern 202. The topology pattern 202 may include the topology roles tier 112 and the components tier 122. As an example, an author may create two topology roles, e.g., the role R1 114 and the role R2 116. Further, the author may define the components in the components tier 122. In other words, certain components are grouped together for certain roles. For instance, the component S1 124, the component S2 126, and the component S3 128 are grouped together for the role R1 114. Further, the component S4 130 and the component S5 132 are grouped together for the role R2 116. Further, their dependencies and constraints are also defined. For example, the component S3 128 has a dependency on the component S1 124 and the component S4 130 has a dependency on the component S3 128.

In one embodiment, the instantiations of the topology pattern 202 are provided to a topology template processing engine 204, which then processes the instantiations and provides them to the deployment targets tier 102 for mapping and provisioning. Factories provided by each topology element may be utilized for the instantiations. Commands provided by each element are utilized to provide deployment/configuration. Each deployment target may be divided into multiple parts. For example, the deployment target D1 104 may be divided into D1-1 and D1-2. Further, the deployment target D2 106 may be divided into D2-1 and D2-2.

Example Extensible Markup Language ("XML") code is provided to illustrate how the topology pattern 202 is generated. First, XML code is provided for the topology pattern 202 definitions:

```
<!-- topology pattern definitions -->
<!--
The owner of a given pattern needs to do the following -
1.   specify the id (for internal ref), name (for external ref);
2.   provide and register a factory class which implements the WBIPatternFactory interface.
     It is used to construct the component data object. In absence, the component
     will be created by the default base factory with only generic properties.
3.   provide and register a command class which implements the WBITopologyCmd
interface.
     This cmd class is used to validate and configure this role. In absence,
     it falls back to the default base command.
4.   specify all roles in the pattern;
5.   specify all applicable runtimes for this pattern.
-->
<wbiTopologyPatterns>
    <!-- register the default base factory class for all patterns -->
    <factory class="com.ibm.wbiserver.nd.topology.factories.base.PatternBaseFactory"/>
    <!-- register the default base cmd for all patterns -->
    <command class="com.ibm.wbiserver.nd.topology.commands.base.PatternBaseCmd"/>
    <pattern id="CondensedSync" name="Single Cluster">
        <!-- register the factory specific for this pattern. If not present, the base one will
be used -->
        <!-- <factory
class="com.ibm.wbiserver.nd.topology.factories.CondensedSync_Factory"/>-->
        <!-- register the cmd specific for this pattern. If not present, the base one will be
used -->
        <!-- <command
class="com.ibm.wbiserver.nd.topology.commands.CondensedSync_Cmd"/> -->
        <roles>
            <role id="ADT"/>
        </roles>
        <!-- list all applicable runtimes -->
        <runtimes>
            <runtime id="WESB"/>
            <runtime id="WPS"/>
        </runtimes>
    </pattern>
    <pattern id="CondensedAsync" name="Remote Messaging">
        <roles>
            <role id="ADT"/>
            <role id="Messaging"/>
        </roles>
        <runtimes>
            <runtime id="WESB"/>
            <runtime id="WPS"/>
        </runtimes>
    </pattern>
    <pattern id="Reference" name="Remote Messaging and Remote Support">
        <roles>
            <role id="ADT"/>
            <role id="Support"/>
            <role id="Messaging"/>
```

-continued

```
        </roles>
        <runtimes>
            <runtime id="WESB"/>
            <runtime id="WPS"/>
        </runtimes>
    </pattern>
</wbiTopologyPatterns>
```

Second, XML code is provided for the topology roles 112 definitions:

```
<!-- topology role definitions -->
<!--
The owner of a given role needs to do the following -
1.  specify the id (for internal ref), name (for external ref);
2.  provide and register a factory class which implements the WBIRoleFactory
interface.
        It is used to construct the component data object. In absence, the component
        will be created by the base factory with only generic properties.
3.  provide and register a command class which implements the WBITopologyCmd
interface.
        This cmd class is used to validate and configure this role. In absence,
        it falls back to the default base command.
-->
<wbiTopologyRoles>
    <!-- register the default base factory class for all roles -->
    <factory
class="com.ibm.wbiserver.nd topology.factories.base.TopologyRoleBaseFactory"/>
    <!-- register the default base cmd for all roles -->
    <command
class="com.ibm.wbiserver.nd.topology.commands.base.TopologyRoleBaseCmd"/>
    <role id="ADT" name="AppTarget" >
        <!-- register the factory specific for ADT. If not present, the base one will
        be used -->
        <!-- <factory
class="com.ibm.wbiserver.nd.topology.factories.ADT_Factory"/> -->
        <!-- register the cmd specific for this role. If not present, the base one will
be used -->
        <!-- <command
class="com.ibm.wbiserver.nd.topology.commands.ADT_Cmd"/> -->
    </role>
    <role id="Support" name="Support" />
    <role id="Messaging" name="Messaging" />
</wbiTopologyRoles>
```

Third, XML code is provided for the topology components 122 definitions:

```
<!-- wbi topology component definitions -->
<!--
To add or edit a component, users need to do the following -
1.  specify the attributes: id (for type ref) and name (for instance ref)
        baseRuntimeId := WAS \ WESB \ WPS
            minimum target runtime requirement
        level ::= [1/2]
            level 1: the comp will be added to topology instance, default value;
            level 2: the comp is only for supporting other comps, hence will not be
the "first class" comp.
        target ::= [any\shared\exclusive]
            any : no deployment target correlation with the components, the default
value.
            shared : can share the deployment target with any other components
            exclusive : cannot share the deployment target with any other
components
2.  specify the mapping to patterns and roles.
3.  provide and register a factory class which implements the
WBIComponentFactory interface.
        It is used to construct the component data object. In absence, the component
        will be created by the base factory with only generic properties.
```

-continued 4. provide and register a command class which implements the WBITopologyCmd interface.
    This cmd class is used to validate and configure this component. In absence,
    it falls back to the default.
5. Specify a list of dependencies which are used to check the integrity of the system and
    determine the config order. The attibutes are -
    id ::= <component_id>
    name ::= [<component_instance_name>]
        required only when there is more than one instance of the comp of the same id.
    type ::= [component\service]
        the default is component.
    use ::= [optional\prohibited\required],
        optional : [default] soft depenendency used for ordering
        required : hard dependency,
        prohibited : mutually exclusive.
    target ::= [any\same\different]
        any : [default] no deployment target correlation with the dependency
        same : collocate with the dependency
        different : not to collocate with the dependency
    Note:
    - chain dependencies are supported. e.g. A->B->C, A, B and C will be put in the right order.
    however, loop dependency detection is not supported yet. e.g. A->B->C->A, in this case,
    A, B C, can appear in any order, i.e. they act as if they have the same ordering weight.
-->
```
<wbiComponents>
    <!-- register the default base factory class for all components -->
    <factory class="com.ibm.wbiserver.nd.topology.factories.base.WBIComponentBaseFactory"/>
    <!-- register the default base cmd for all components -->
    <command class="com.ibm.wbiserver.nd.topology.commands.base.WBIComponentBaseCmd"/>
    <component id="WBI_SCA" name="WBI_SCA" baseRuntimeId="WESB" level="1" target="any">
    <!--
    <component id="WBI_SCA" name="WBI_SCA" baseRuntimeId="WESB" level="1" target="any" version="any">
    -->
        <!-- qualified runtime capabilities -->
        <runtimes>
            <runtime id="WPS"/>
            <runtime id="WESB"/>
        </runtimes>
        <!-- qualified patterns and roles -->
        <patterns>
            <pattern id="CondensedSync">
                <role id="ADT" />
            </pattern>
            <pattern id="CondensedAsync">
                <role id="ADT" />
            </pattern>
            <pattern id="Reference">
                <role id="ADT" />
            </pattern>
        </patterns>
        <!-- register the factory used to create the SCA comp with two buses ... -->
        <factory class="com.ibm.wbiserver.nd.topology.factories.impl.WBI_SCA_Factory"/>
        <!-- register the cmd used to validate and configure SCA -->
        <command class="com.ibm.wbiserver.nd.topology.commands.impl.WBI_SCA_Cmd"/>
        <!-- The dependencies are used to check integrity of the system and determine the config order -->
        <dependencies>
            <dependency id="WBI_CEI" type="component" use="optional"/>
        </dependencies>
    </component>
```

In one embodiment, the topology template processing engine 204 will parse the topology definition XML and understand all predefined patterns. For example, when a user would like a topology of a particular pattern such as the topology pattern 202, the topology template processing engine 204 generates an instance from the topology pattern 202. All constraints are evaluated and enforced. Further, the deployment targets tier 102, i.e., the runtime capability, requirements will be calculated on each role. In addition, all default values, which may be overridden by users through an administrative console, will be set.

The user may map the deployment targets through a wizard to the topology roles. If all the constraints are met, the topology instance will be configured automatically on the runtime system. An example of the three-tier coarse grained SOA topology pattern model and modeling language for expressing it is utilized in IBM WEBSPHERE PROCESS SERVER ("WPS") 6.1.

Figure 2B:
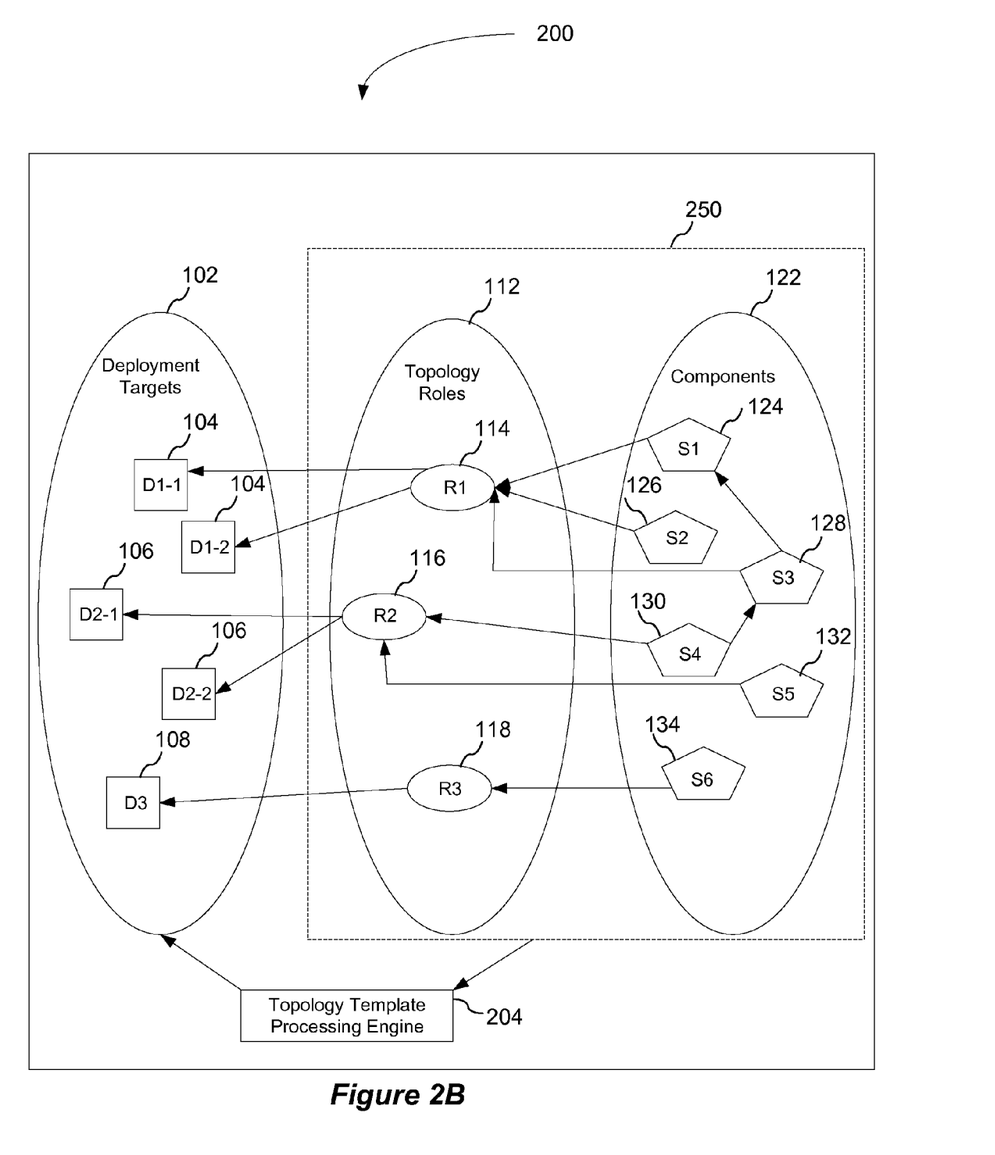
FIG. 2B illustrates the authoring configuration of FIG. 2A that defines a topology pattern.

FIG. 2B illustrates the authoring configuration 200 of FIG. 2A that defines a topology pattern 250. By editing the topology definition, e.g., the XML definition, users can modify a topology definition. Accordingly, a user can modify the XML definition for the topology pattern 202 to include the component S6 134 that corresponds to the role R3 118, which corresponds to the deployment target D3 108. The modified topology pattern results in the topology pattern 250. As a result, the authoring configuration 200 is very extensible and flexible.

Figure 3:
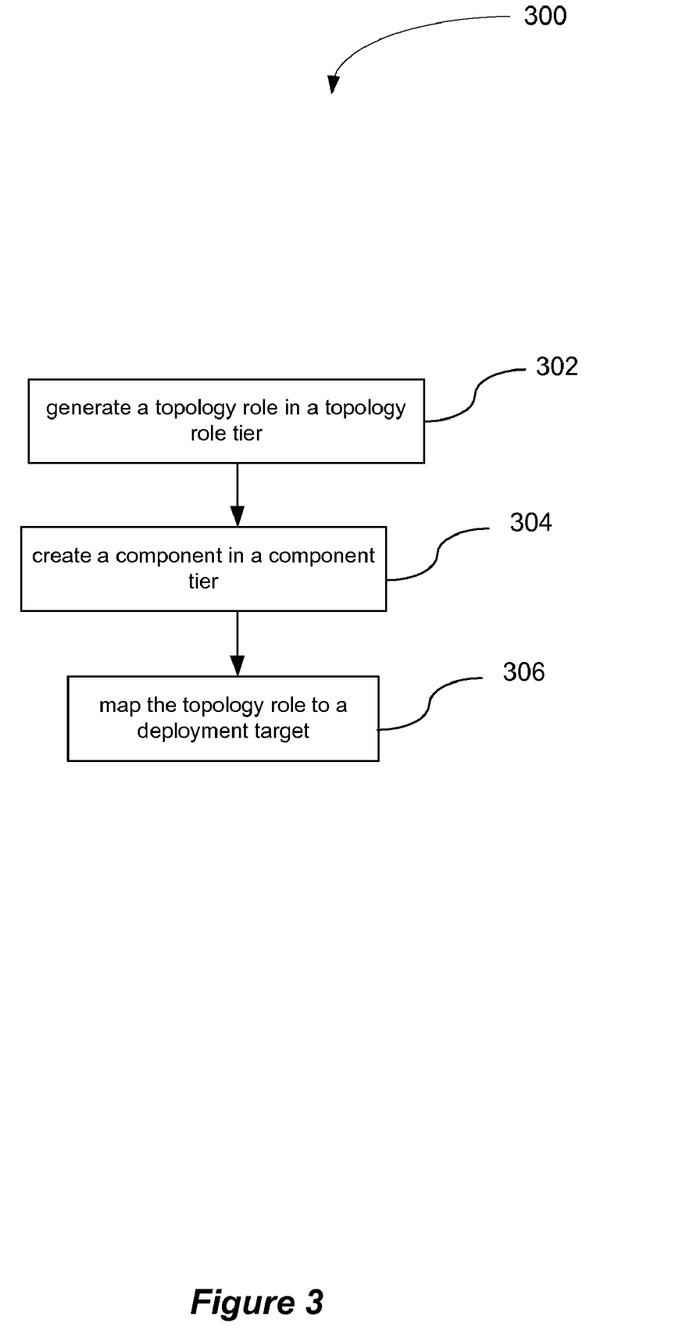
FIG. 3 illustrates a process that may be utilized to author a topology pattern.

FIG. 3 illustrates a process 300 that may be utilized to author a topology pattern. At a process block 302, the process 300 generates a topology role in a topology role tier that is included in a topology pattern. Further, at a process block 304, the process 300 creates a component in a component tier that is defined in the topology pattern such that the component corresponds to the topology role. Finally, at a process block 306, the process 300 maps the topology role to a deployment target.

Figure 4:
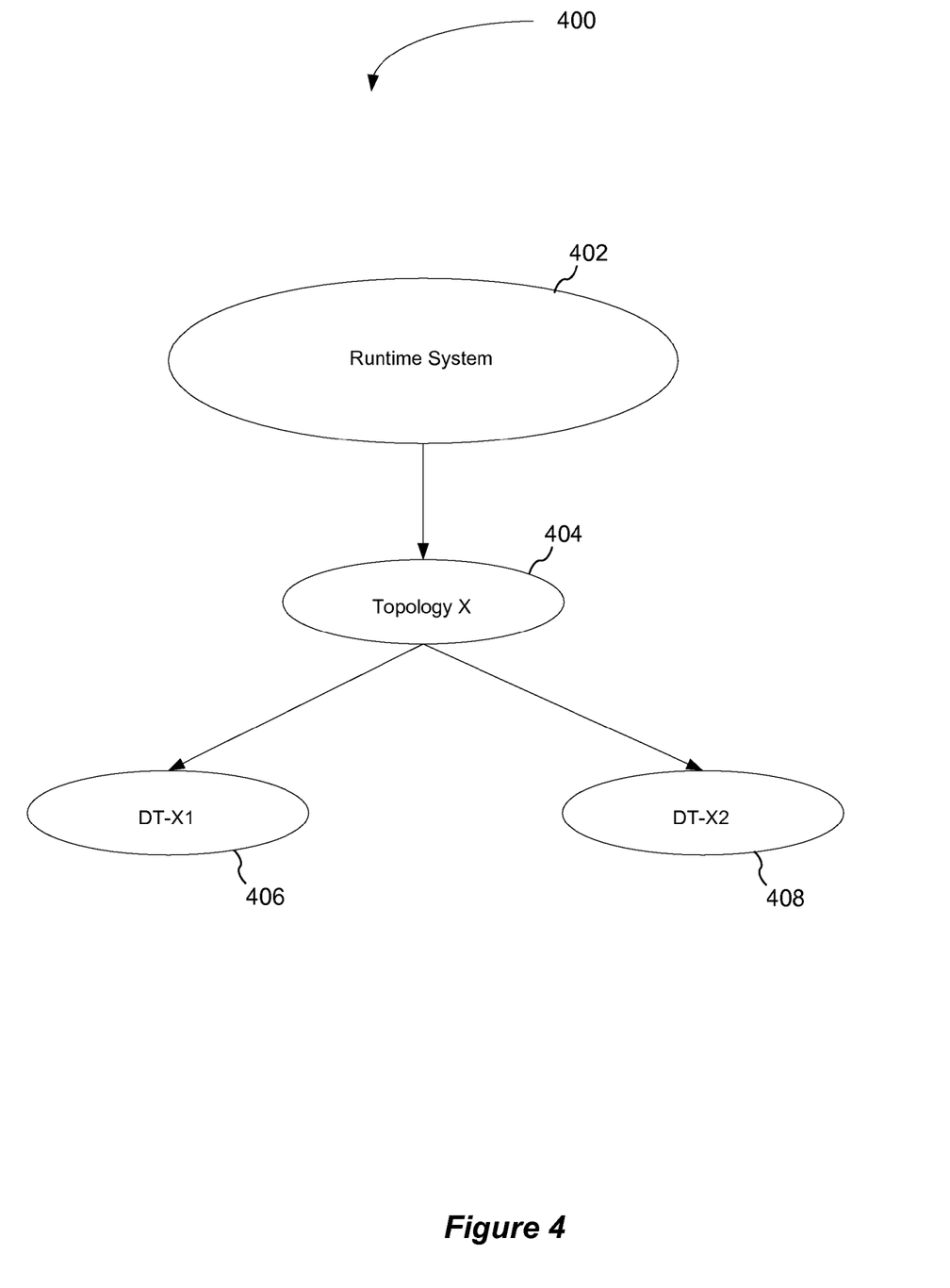
FIG. 4 illustrates a top-down topology configuration.

FIG. 4 illustrates a top-down topology configuration 400. A runtime system 402 generates a topology X 404. The topology X may then be utilized for different deployment targets. For example, the topology X may be customized to generate a topology X1 so that a deployment target is linked to topology X1 ("DT-X1") 406. Further, the topology X may be customized to generated a topology X2 so that a deployment target is linked to topology X2 ("DT-X2") 408. Accordingly, the topology X may be customized for a plurality of deployments targets, i.e., DT-X1 406 through DT-XN. The top-down topology configuration 400 provides an explicit approach that is guided, automated, portable, reusable, and editable. In contrast, a bottom-up topology configuration is an implicit approach that is manual, lengthy, painstaking, error-prone, tedious, non-portable, and non-replicable. For example, lengthy instructions may have to be followed to utilize the bottom-up topology configuration.

Figure 5:
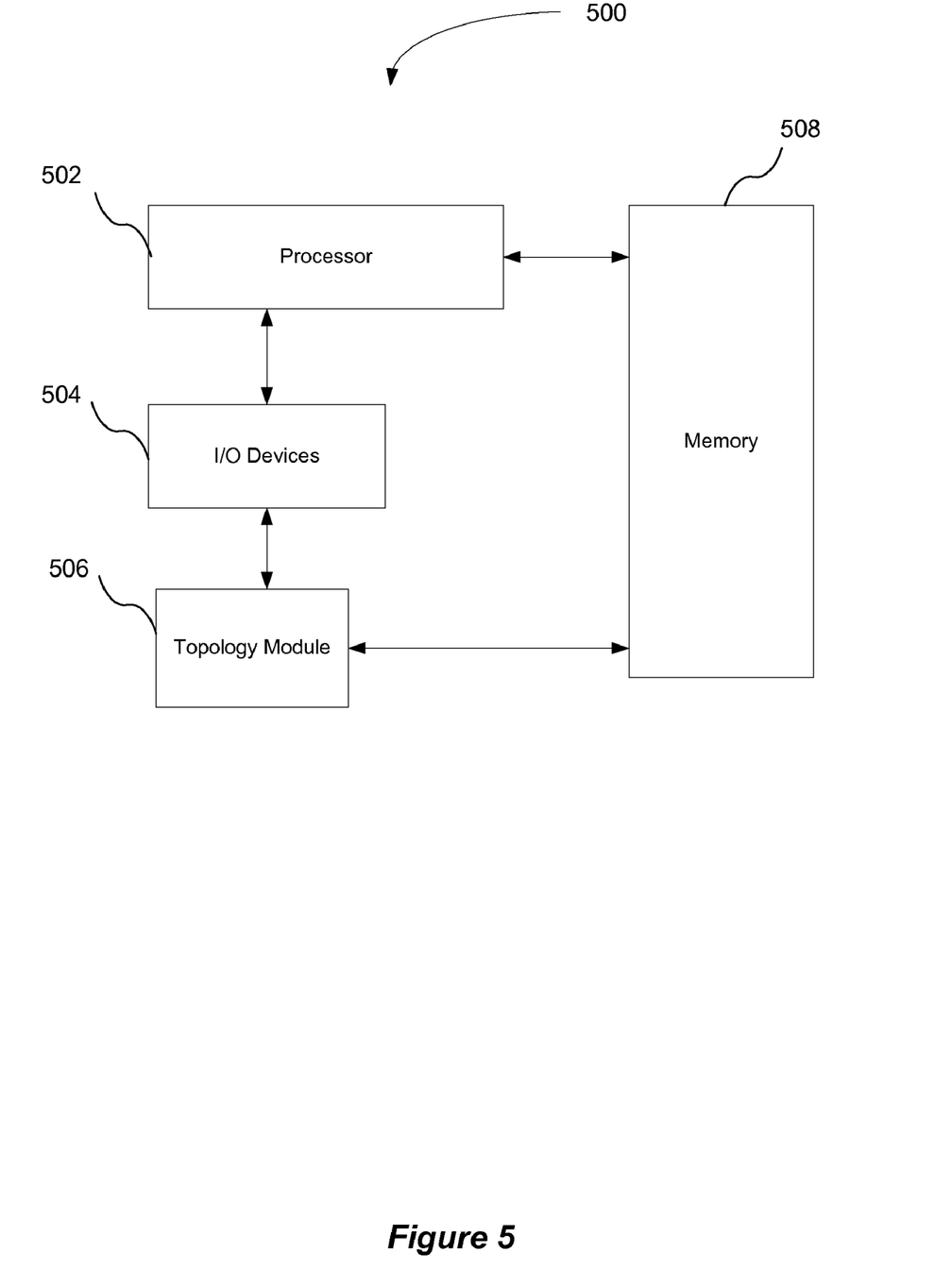
FIG. 5 illustrates a block diagram of a system that authors a topology.

FIG. 5 illustrates a block diagram of a system 500 that authors a topology. In one embodiment, the system 500 is suitable for storing and/or executing program code and is implemented using a general purpose computer or any other hardware equivalents. Thus, the system 500 comprises a processor 502, a memory 508, e.g., random access memory ("RAM") and/or read only memory ("ROM"), a topology module 506, and various input/output devices 504.

The processor 502 is coupled, either directly or indirectly, to the memory 508 through a system bus. The memory 508 can include local memory employed during actual execution of the program code, bulk storage, and/or cache memories which provide temporary storage of at least some program code in order to reduce the number of times code must be retrieved from bulk storage during execution.

The input/output devices 504 can be coupled directly to the system 500 or through intervening input/output controllers. Further, the input/output devices 504 can include a keyboard, a keypad, a mouse, a microphone for capturing speech commands, a pointing device, and other user input devices that will be recognized by one of ordinary skill in the art. Further, the input/output devices 504 can include a receiver, transmitter, speaker, display, image capture sensor, biometric sensor, etc. In addition, the input/output devices 504 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W"), and DVD.

While the apparatus and method have been described in terms of what are presently considered to be the most practical and preferred embodiments, it is to be understood that the disclosure need not be limited to the disclosed embodiments. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims and

* IBM and WEBSPHERE are registered trademarks of International Business Machines Corporation in the United States, other countries, or both.

We claim:

1. A computer program product comprising a storage device storing a computer readable program, wherein the computer readable program when executed on a computer causes the computer to:

receive a topology pattern definition that specifies one or more topology roles, one or more components, and one or more deployment targets;

receive one or more topology role definitions for the one or more topology roles, wherein a first factory class is registered that implements a role interface;

receive one or more component definitions for the one or more components, wherein a second factory class is registered that implements a component interface;

parse the topology pattern definition to identify the topology pattern; and generate an instance of a topology from the topology pattern by:

generating the one or more topology roles in a topology role tier that is included in the topology pattern using the one or more topology role definitions;

creating components in a component tier that are each defined in the topology pattern using the one or more component definitions, wherein each of the components corresponds to one of the one or more topology roles, and wherein at least one of the components has a dependency on another one of the components; and mapping the one or more topology roles to the one or more deployment targets.

2. The computer program product of claim 1, wherein the topology pattern is configured for a Service Oriented Architecture.

3. The computer program product of claim 1, wherein the topology pattern is defined according to Extensible Markup Language.

4. The computer program product of claim 1, wherein at least one component is loosely coupled such that the component is independently deployable and configurable.

5. The computer program product of claim 1, wherein at least one component is self contained such that the component can instantiate and configure itself.

6. The computer program product of claim 1, wherein at least one deployment target is a single server that hosts the component.

7. The computer program product of claim 1, wherein at least one deployment target is a cluster serving as a unit that hosts the component.

8. A method comprising:

receiving a topology pattern definition that specifies one or more topology roles, one or more components, and one or more deployment targets;

receiving one or more topology role definitions for the one or more topology roles, wherein a first factory class is registered that implements a role interface;

receiving one or more component definitions for the one or more components, wherein a second factory class is registered that implements a component interface;

parsing the topology pattern definition to identify the topology pattern; and generating an instance of a topology from the topology pattern by:

generating the one or more topology roles in a topology role tier that is included in the topology pattern using the one or more topology role definitions;

creating components in a component tier that are each defined in the topology pattern using the one or more component definitions, wherein each of the components corresponds to one of the one or more topology roles, and wherein at least one of the components has a dependency on another one of the components; and mapping the one or more topology roles to the one or more deployment targets.

9. The method of claim 8, wherein the topology pattern is configured for a Service Oriented Architecture.

10. The method of claim 8, wherein the topology pattern is defined according to Extensible Markup Language.

11. The method of claim 8, wherein at least one component is loosely coupled such that the component is independently deployable and configurable.

12. The method of claim 8, wherein at least one component is self contained such that the component can instantiate and configure itself.

13. The method of claim 8, wherein at least one deployment target is a single server that hosts the component.

14. The method of claim 8, wherein at least one deployment target is a cluster serving as a unit that hosts the component.

15. A system comprising:

a processor;

a storage device storing program code, wherein the processor executes the program code to perform operations comprising:

receiving a topology pattern definition that specifies one or more topology roles, one or more components, and one or more deployment targets;

receiving one or more topology role definitions for the one or more topology roles, wherein a first factory class is registered that implements a role interface;

receiving one or more component definitions for the one or more components, wherein a second factory class is registered that implements a component interface;

parsing the topology pattern definition to identify the topology pattern; and generating an instance of a topology from the topology pattern by:

generating the one or more topology roles in a topology role tier that is included in the topology pattern using the one or more topology role definitions;

creating components in a component tier that are each defined in the topology pattern using the one or more component definitions, wherein each of the components corresponds to one of the one or more topology roles, wherein at least one of the components has a dependency on another one of the components; and mapping the one or more topology roles to the one or more deployment targets.

16. The system of claim 15, wherein the topology pattern is configured for a Service Oriented Architecture.

17. The system of claim 15, wherein the topology pattern is defined according to Extensible Markup Language.

18. The system of claim 15, wherein at least one component is loosely coupled such that the component is independently deployable and configurable.

19. The system of claim 15, wherein at least one component is self contained such that the component can instantiate and configure itself.

20. The system of claim 15, wherein at least one deployment target is a single server that hosts the component.

* * * * *